June 3, 1941. C. H. CUPPLES 2,243,896
DEVICE FOR SUPPLYING FOOD TO FISH OR LAND ANIMALS
Filed March 30, 1940 3 Sheets-Sheet 1

INVENTOR
Charles Henry Cupples
BY
ATTORNEY

June 3, 1941.  C. H. CUPPLES  2,243,896
DEVICE FOR SUPPLYING FOOD TO FISH OR LAND ANIMALS
Filed March 30, 1940  3 Sheets-Sheet 2
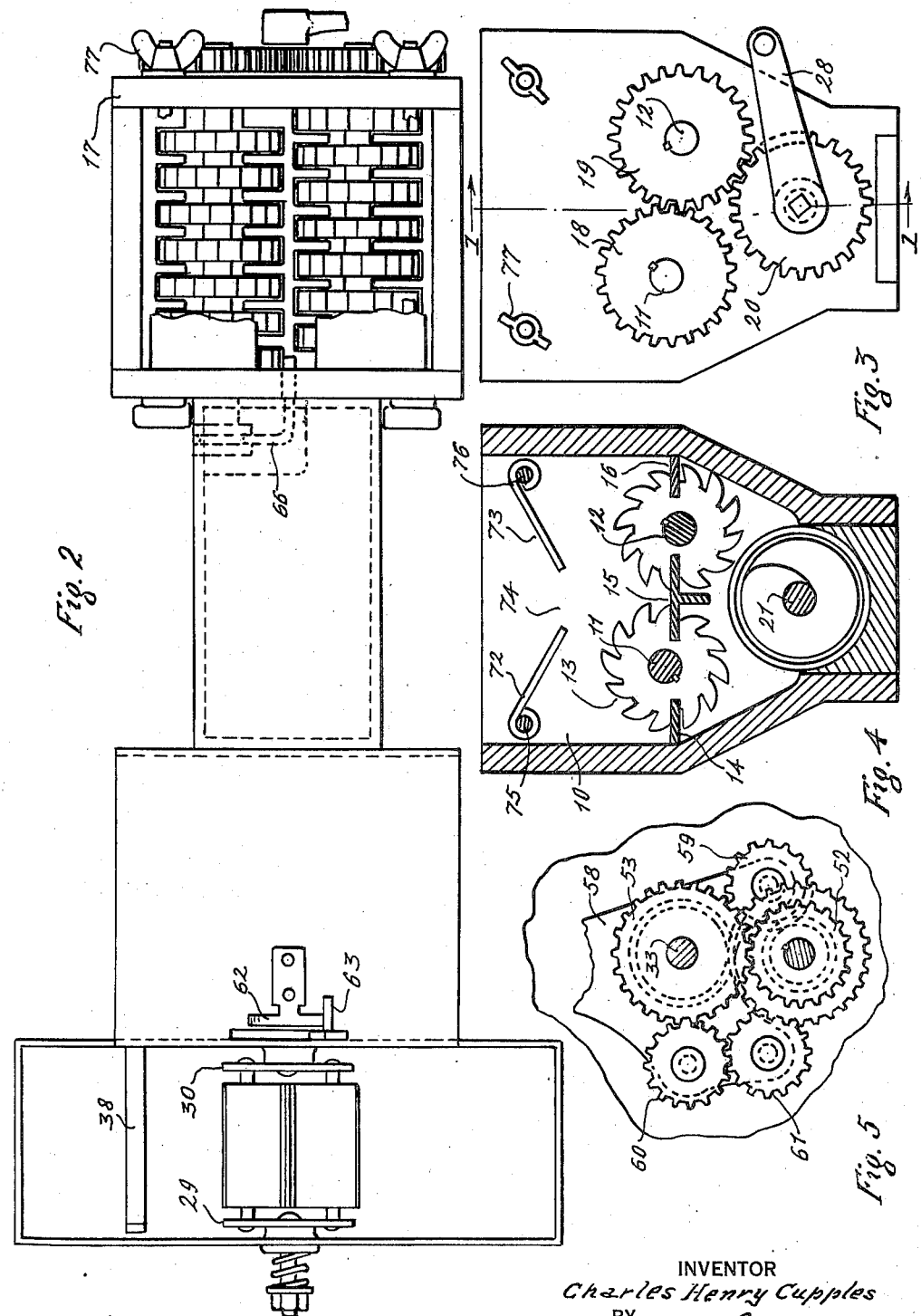

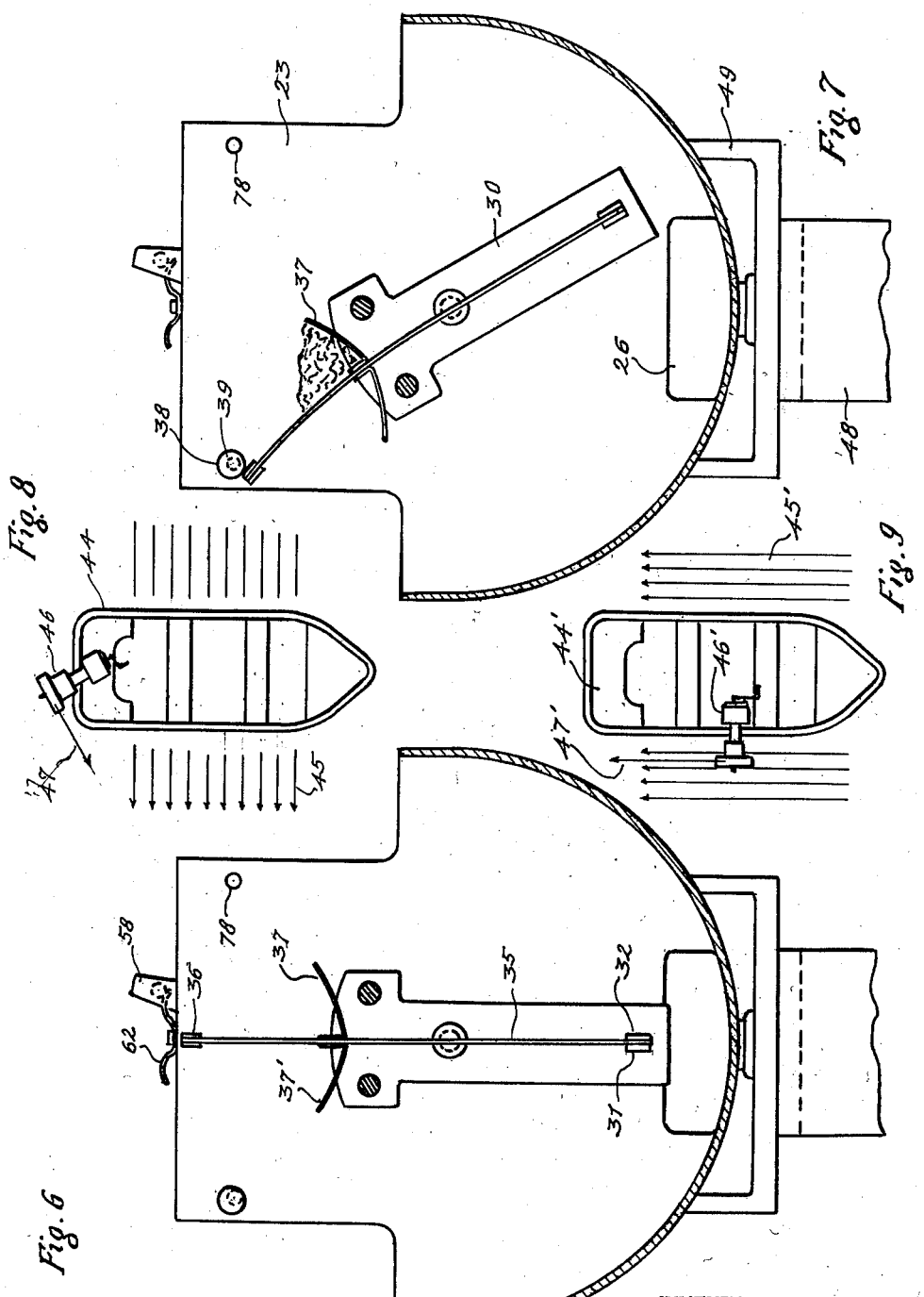

Patented June 3, 1941

2,243,896

UNITED STATES PATENT OFFICE 2,243,896

DEVICE FOR SUPPLYING FOOD TO FISH OR LAND ANIMALS

Charles Henry Cupples, Red Bank, N. J.

Application March 30, 1940, Serial No. 327,063

12 Claims. (Cl. 43—4)

This invention relates to the art of supplying food or bait to animals and more particularly refers to improvements in machines for supplying bait or food in comminuted form at spaced intervals for the purpose of catching or feeding fish and for feeding poultry, etc.

In the conduct of fishing operations from a boat or pier, bait is usually thrown at a distance on the water to run with the tide when a school of fish is passing, as a lure for the fish. The bait, which is called chum, usually consists of fish cut up in a meat grinder, and the operation which is called chumming is performed by throwing out a handful of chum at frequent intervals while the fish are running. The fish which is used for bait is generally in a state of incipient or advanced decomposition, so that the handling of it constitutes a very disagreeable duty for the man attending to it. Furthermore, the necessity of preparing the bait or chum consumes valuable time that the man could more profitably devote to catching the fish.

It is, therefore, very desirable to improve the conditions under which the casting of bait or chum is performed and to provide means whereby the bait or chum may be thrown at the proper distance and in the proper direction in an automatic or semi-automatic manner.

In feeding poultry it is also desirable to supply a given quantity of food in a given period of time. In large fish and poultry hatcheries, the feeding of the animals entails the expenditure of considerable time and labor, especially because a uniform supply can only be obtained by exercising the utmost care and attention.

The primary object of this invention is to provide a novel and improved device, by means of which the food or bait may be thrown at a distance at spaced intervals merely by turning a shaft operating a conveyor advancing the food or bait to the casting or throwing mechanism.

Another object is to provide a device of the character specified, adapted to be adjusted both as to direction and range of throw, and adapted to reverse the direction of throw while the conveyor shaft is always rotated in the same direction.

A further object is to provide a chumming device, especially designed for casting chum or bait to fish, which is complete with means for breaking up the fish into small particles, means for throwing the broken up bait or chum at a distance in a given direction, and means for conveying said bait or chum from the breaking up means to the throwing means.

A still further object is to provide, in a device of the character specified, means for supplying a quantity of water to the fish used for bait before or after it is broken into small pieces in order to facilitate its travel through the conveyor from the breaking up device to the casting device.

Other objects and advantages of the present invention will more fully appear as the description proceeds and will be set forth and claimed in the appended claims.

My invention is illustrated by way of example in the accompanying drawings, in which:

Fig. 2 is a plan view thereof, with parts broken away;

Fig. 3 is an end view in elevation thereof;

Fig. 4 is a vertical transversal section through line 4—4 of Fig. 1, showing the cutting device forming part of the machine;

Fig. 5 is a fragmentary vertical transversal section, showing the reversing gearing controlling the direction of operation of the throwing device;

Fig. 6 is a vertical transversal section through line 6—6 of Fig. 1, showing the collector and the throwing device or flipper housed therein, in a position of rest;

Fig. 7 is a similar view showing the flipper at a point of its rotation in which it begins to be set under tension, making ready to project a certain amount of bait at a distance upon the water;

Figure 1:
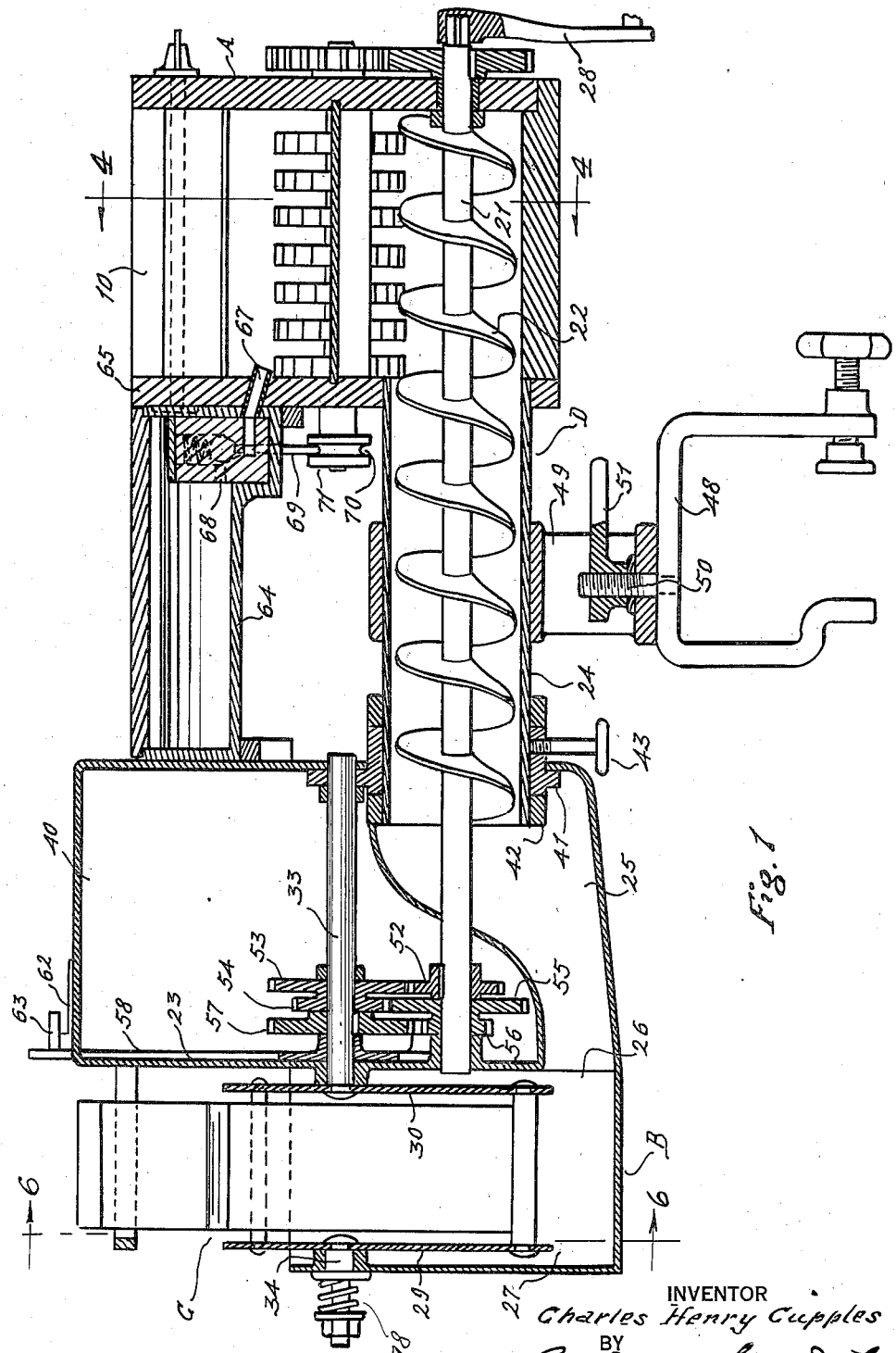
Fig. 1 is a vertical longitudinal section through line 1—1 of Fig. 3 of a chumming machine embodying my invention.

Fig. 8 is a plan view of a boat anchored across the direction of the tide, said boat being equipped with a chumming machine, such as shown in the preceding drawings, mounted at the stern at an angle suitable for throwing the bait in the direction of the tide; and Fig. 9 is a similar view showing the boat anchored in the direction of the tide and equipped with the chumming machine mounted on its side and set to cast the bait towards the stern of the boat.

My improved device essentially consists of a feeder section, a collector equipped with a flipper device, and a conveyor section for conveying the food or bait from the feeder to the collector. In such cases where the material, such as fish bait, to be delivered to the collector is to be cut into small pieces, the feeder is equipped with suitable means for cutting up and reducing the food material to the proper size.

The drawings illustrate a machine embodying my invention particularly designed for feeding bait to fish. In the same A designates the feeder or hopper section, B the collector, C the flipper device and D the conveyor interposed between the feeder and the collector.

The feeder section comprises an open top box or hopper 10, in which are mounted two parallel transversely spaced shafts 11, 12, each carrying a plurality of longitudinally spaced circular cutters 13 passing between the teeth of comb-shaped bars 14, 15, 16, coacting therewith in cutting up into small pieces the chunks of fish introduced from the top into the hopper.

Shafts 11, 12 extend through the rear wall 17 of the hopper and are respectively provided with meshing gear wheels 18, 19, said wheel 19 also meshing with another gear wheel 20 mounted on shaft 21 of screw conveyor 22.

The screw conveyor 22 extends longitudinally of the device from the lower part of the hopper through a tubular conduit 24 to the rear end of the passage 25 leading through its outlet 26 to the lower end of a semi-circular receptacle 27, constituting the collector proper, from which the food or bait is scooped up by the flipper at each revolution, to be thrown in the proper direction and at the proper distance.

Shaft 21 of the screw conveyor is rotatably mounted between the rear wall 17 of the hopper and rear wall 23 of the collector, and said shaft may be rotated by hand by means of a handle 28 or else may be driven by power, as the case may be.

When shaft 21 is rotated in a clockwise direction with reference to Fig. 3, gearwheel 19 and with it shaft 12 will be rotated in a counterclockwise direction, and gearwheel 18 with its shaft 11 will be rotated in a clockwise direction, so that the cutters 13 will be rotated to catch the food material at the center of the hopper and cut it between the projections of central comb-shaped bar 15.

The food material thus cut in small pieces will fall directly in the path of the screw conveyor which will convey said material through conduit 24 and gradually discharge it into passage 25 and from there into collector receptacle 27.

The flipper device is rotatably mounted within receptacle 27. Said device consists of a U-frame, comprising two sides 29, 30, connected at their lower end by spacing bars 31, 32, said U-frame being carried by and depending from two coaxial shafts 33, 34 parallel to and vertically spaced from conveyor shaft 21.

Shaft 33 is operatively associated with conveyor shaft 21 by means of intermeshing gears, so that the operation of the screw conveyor will cause the rotation of shaft 33 and of the U-frame 29—30—31—32 connected thereto.

When the device is intended for use for feeding poultry it is not necessary to provide means for cutting up the food because said food already comes in communiuted form adapted to be fed directly from the hopper to the screw conveyor. In such case, it is usually sufficient to mount the device in a permanent position so as to always throw the food in the same direction; therefore, the connection between shafts 21 and 33 need not be reversible and only has to be such as to cause the rotation of the screw conveyor in the conveying direction to be transformed into rotation of shaft 33 in the food throwing direction.

Where, like in the present case, the device is intended for supplying bait to fish, it is desirable for the device to have a maximum of flexibility of control so as to make it possible for the bait to be thrown in any direction. The geared connection between shafts 21 and 33 is, therefore, reversible, so that the movement of rotation of the screw conveyor in the conveying direction can be transmitted to the flipper device in either direction.

Before describing the manner in which the rotatory movement of shaft 33 may be produced, I will explain the operation of the flipper device proper. Besides the U-shaped frame 29—30—31—32, said device comprises a flipper in the form of a spring blade 35, one end of which is mounted between bars 31, 32, said flipper blade extending therefrom centrally of the U-frame with its free end 36 remaining at a distance from the center of shafts 33, 34, which is also the center of semi-circular receptacle 27, substantially equivalent to the radius of said receptacle 27. It will be understood that by virtue of this construction when the flipper device is rotated, together with its shafts 33, 34, the free end of the flipper blade will travel along the inner surface of the semi-circular wall of receptacle 27 in close proximity to said surface. At a point intermediate its free end and its center of rotation, the flipper blade is provided with a scoop 37 extending therefrom in the direction of the rotation of the flipper device. When, like in the case illustrated, the direction of rotation of the flipper device is reversible, the flipper blade is provided with another scoop 37' extending therefrom in the direction opposite to that of scoop 37.

Referring more particularly to Figs. 6 and 7, and assuming that from the position of rest shown in Fig. 6 the flipper device is rotated in a clockwise direction, it will be understood that the free end of the flipper blade will eventually come in contact with such food or bait as may have collected at the bottom of the collector chamber and upon the movement of rotation of the flipper device continuing, said food or bait will be gradually moved along the surface of the collector towards the open top thereof, until the flipper blade having passed the horizontal position, said food or bait will be carried upwardly by said blade and will eventually slide downwardly along the surface of said blade and into the scoop 37, as shown in Fig. 7.

The rear wall 23 of the collector receptacle extends vertically a certain distance above the open top of said receptacle and is provided with a bar 38 extending directly across and above the collector receptacle in the path of the free end of the flipper blade.

When, in the course of its rotation, the free end of flipper blade comes to bear against bar 38, and the movement of rotation of the flipper device continues, said flipper blade will be gradually deflected bow fashion until the flipper device will have reached a point in its travel where the flipper blade can snap free of the bar 38.

The gradual flexing of the flipper blade thus taking place sets said blade under considerable tension, so that when it finally snaps to its normal straight condition the food or bait carried thereby in proximity of its free end will be projected with considerable force to a distance which will depend upon the amount of flexing to which the flipper blade has been subjected and upon the direction of the plane of the flipper blade when the snapping takes place.

In order to regulate the operation of the flipper device, I prefer to make the factors of both the amount of flexing of the flipper blade and the direction of its plane with respect to the vertical when the snapping action takes place, adjustable. For instance, the axis of the body of bar 38 may be made eccentric with respect to the axis of its attaching stud portion 39, so that by varying the angular position of the axis of said body portion with respect to that of the axis of the stud portion, it will be possible to cause the periphery of the body portion of bar 38 to project more or less in the path of the free end of the flipper blade and thus to cause flexing of said blade to a greater or lesser extent.

In order to vary the inclination of the plane of the flipper blade with respect to the vertical when the snapping action takes place, I mount the entire collector frame, including its passage 25 and its rear extension 40, on collars 41, 42, carried by and angularly adjustable with respect to the outer end of the conveyor conduit 24. Collar 41 is provided with a set screw 43 by means of which it can be fixed at any desired angular position.

As stated, in the case of a device designed for supplying bait to fish, it is desirable that the movement of the flipper device be reversible. This is due to the fact that when the device is used in a boat, it should be possible to mount it in a position where it will least interfere with the work of the fishermen while throwing the bait in the proper direction according to the direction in which the tide is running. For instance, in Fig. 8, 44 designates a boat anchored at right angles to the direction in which the tide is running, which direction is indicated by arrows 45. The devce is shown at 46 attached to the edge of the boat at the stern, at an angle causing its flipper device to throw bait to the left towards the direction of the tide, as indicated by arrow 47. It will be readily understood that if the boat were anchored in the same position and the tide were running in the opposite direction it would be necessary for the bait to be thrown towards the right, that is, that the flipper be rotated in the opposite direction. It is also apparent that it would be desirable that the means for mounting the device in position be such as to permit of the entire device being set at different angles in a horizontal plane.

The latter feature can be easily provided by mounting the device on a clamping member 48 by means of a clamping structure 49, embracing conduit 24, said clamping structure 49 being adjustable about a pivot 50 vertically extending from clamping member 48 and being adapted to be set at any angular position with respect to said pivot by means of a locking member 51.

The direction of rotation of the flipper device can be reversed in any suitable manner, for instance, by means of the train of gears shown in Figs. 1 and 5. In the same it is seen that shaft 21 carries a gearwheel 52 fixed on said shaft, said wheel meshing with a gearwheel 53 integral with another gearwheel 54 loosely mounted on shaft 33. Gearwheel 54 in its turn is in mesh with another gearwheel 55 integral with a gear wheel 56 loosely mounted on shaft 21. Shaft 33 also carries a gearwheel 57 fixed on said shaft, and a shifting lever 58 pivotally mounted on said shaft.

Said shifting lever 58 carries a pinion 59 and a pinion 60 angularly spaced therefrom, both of said pinions being permanently in mesh with gearwheel 57. Said shifting lever 58 also carries a pinion 61 permanently in mesh with pinion 60, said pinion 61 being angularly spaced from pinion 59 so that when the shifting lever 58 is in the position shown in Fig. 5 and pinion 59 is in mesh with gear wheel 56, pinion 61 entirely clears said gearwheel 56. It will be seen that in this position the rotatory movement of gearwheel 52 in a clockwise direction with respect to Fig. 5, will ultimately be transmitted to gearwheel 57 and thus to shaft 33 in the same direction. If the shifting lever is angularly displaced in a counterclockwise direction, so as to free pinion 59 from and bring pinion 61 into meshing relation with gearwheel 56, the direction of rotation of shaft 33 and consequently of the flipper device will be reversed while the conveyor shaft continues to rotate in the same direction.

The shifting lever 58 may be retained in either of its operative positions by means of a spring stop member 62 mounted at the top of extension 40, engaging a pin 63 rearwardly extending from the outer end of shifting lever 58.

In order to facilitate feeding of the bait by the conveyor and prevent clogging, I prefer to supply a small quantity of water to the hopper from time to time so that the material will flow more easily. The supplying of water should preferably take place automatically at given intervals during the operation of the device. An arrangement to this end is illustrated by way of example in Figs. 1 and 2, in which 64 is a water tank extending from the inner wall 65 of the hopper, said tank being provided with a discharge passage 66 leading to an outlet 67 discharging into the hopper. Passage 66 is normally closed by a spring pressed ball valve 68 which may be raised from its seat by means of a rod 69. Said rod 69 rests against the surface of a cam groove 70 of a cam 71 carried by the inner end of shaft 12. Cam groove 70 has an eccentric outline so that at a given point of each revolution of shaft 12 it will raise rod 69 a certain amount, causing said rod to force ball valve 68 away from its seat to allow a certain amount of water to be discharged through passage 66 and outlet 67.

The feeding of the material to be ground or cut by the choppers is preferably regulated by providing the hopper with two inclined longitudinal feed plates 72, 73, separated by a central passage 74, said two plates being adjustable about their pivotal supports 75, 76 by means of clamp nuts 77, in order to vary their inclination and the width of passage 74. Such an arrangement is particularly useful for supplying food in grain or other comminuted form of the screw conveyor in a gradual manner in devices intended for feeding poultry and other animals.

In Fig. 9 I illustrate my device 46' mounted on the side of a boat 44' anchored in the direction of the tide, shown by arrows 45', the device being arranged to throw the bait in the direction in which the tide is running as indicated by arrow 47'.

It is obvious that when a reversible flipper device is employed, the position of the bar 38, causing the flexing of the flipper blade, should be changed accordingly; therefore, I provide the rear wall 23 of the collector with another opening 78 adapted to receive stud portion 39 of bar 38 at a point directly opposite to and symmetrical with that at which bar 38 is shown in Figs. 5 and 7, it being understood that stud 39 may be threaded and may be provided with a nut firmly retaining it in position.

The constructional details of the device may vary from those shown without departing from the inventive idea. The drawings should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. In apparatus for supplying feed, an open top substantially semicircular feed containing receptacle, a feed projecting device rotatable about the axis thereof, said device comprising a spring acting blade member having a scoop member extending from each of its sides, said blade member being adapted to extend within said receptacle and to scoop up a measured quantity of feed therefrom at each revolution, a reversible gearing for rotating said device in either direction, and means for setting said blade member under tension when it reaches its feed projecting position.

2. In apparatus for supplying feed, an open top substantially semicircular feed containing receptacle, a feed projecting device rotatable about the axis thereof, said device comprising a spring acting blade member having a scoop member extending therefrom, said blade member being adapted to extend within said receptacle and to scoop up a measured quantity of feed therefrom at each revolution, means for subsequently setting said blade member under tension when it reaches its feed projecting position, means for varying the angular position of said feed projecting position with respect to a vertical plane passing through said axis, to vary the angle at which the feed is projected with respect to the horizontal, and means for rotating said device in a given direction.

3. In apparatus for supplying feed, an open top substantially semicircular feed containing receptacle, a feed projecting device rotatable about the axis thereof, said device comprising a spring acting blade member having a scoop member extending from each of its sides, said blade member being adapted to extend within said receptacle and to scoop up a measured quantity of feed therefrom at each revolution, reversible means for rotating said device in either direction, adjustable means for setting said blade member under greater or lesser tension when it reaches its feed projecting position, and means for varying the angular position of said feed projecting position with respect to a vertical plane passing through said axis, to vary the angle at which the feed is projected with respect to the horizontal.

4. An apparatus for supplying feed comprising a feed supplying chamber, a feed collecting receptacle, a conveying device conveying to and forcing feed directly into said receptacle interposed therebetween, means within said chamber for chopping the feed supplied to said conveying device, and a feed projecting device comprising a rotatable spring acting blade member having a scoop member extending therefrom, said blade member being adapted to extend within said receptacle and to scoop up a measured quantity of feed therefrom at each revolution, and means for setting said member under tension when it reaches its feed projecting position.

5. An apparatus for supplying feed comprising a feed supplying chamber, a feed collecting receptacle, a conveying device conveying to and forcing feed directly into said receptacle interposed therebetween, a feed projecting device comprising a rotatable spring acting blade member having a scoop member extending from each of its sides, said blade member being adapted to extend within said receptacle and to scoop up a measured quantity of feed therefrom at each revolution, means for setting said member under tension when it reaches its feed projecting position, and a reversible gearing for rotating said blade member in either direction.

6. An apparatus for supplying feed comprising a feed supplying chamber, a feed collecting receptacle, a conveying device interposed therebetween, a feed projecting device comprising a rotatable spring acting blade member having a scoop member extending therefrom, said blade member being adapted to extend within said receptacle and to scoop up a measured quantity of feed therefrom at each revolution, and means for setting said member under tension when it reaches its feed projecting position, means for securing said apparatus in position, and an angularly adjustable connection between said apparatus and said securing means.

7. An apparatus for supplying feed comprising a feed supplying chamber, an open top substantially semicircular feed collecting receptacle, a conveying device conveying to and forcing feed directly into said receptacle interposed therebetween, means within said chamber for chopping the feed supplied to said conveying device, a feed projecting device rotatable about the axis of said receptacle, comprising a spring acting blade member having a scoop member extending therefrom, said blade member being adapted to extend within said receptacle and to scoop up a measured quantity of feed therefrom at each revolution, means for setting said blade member under tension when it reaches its feed projecting position, means for rotating said conveying device in the feed conveying direction, and means operatively associated therewith for actuating said chopping means and feed projecting device.

8. An apparatus for supplying feed comprising a feed supplying chamber, an open top substantially semicircular feed collecting receptacle, a conveying device interposed therebetween, means within said chamber for chopping the feed supplied to said conveying device, a feed projecting device rotatable about the axis of said receptacle, comprising a spring acting blade member having a scoop member extending from each of its sides, said blade member being adapted to extend within said receptacle and to scoop up a measured quantity of feed therefrom at each revolution, means for setting said blade member under tension when it reaches its feed projecting position, means for rotating said conveying device in the feed conveying direction, and a reversible operative connection between said conveying device and feed projecting device.

9. An apparatus for supplying feed comprising a feed supplying chamber, an open top substantially semicircular feed collecting receptacle, a conveying device interposed therebetween, means within said chamber for chopping the feed supplied to said conveying device, a feed projecting device rotatable about the axis of said receptacle, comprising a spring acting blade member having a scoop member extending from each of its sides, said blade member being adapted to extend within said receptacle and to scoop up a measured quantity of feed therefrom at each revolution, adjustable means for setting said blade member under greater or lesser tension when it reaches its feed projecting position, means for rotating said conveying device in the feed conveying direction, and a reversible operative connection between said conveying device and feed projecting device.

10. An apparatus for supplying feed comprising a feed supplying chamber, an open top substantially semicircular feed collecting receptacle, a conveying device interposed therebetween, means within said chamber for chopping the feed supplied to said conveying device, a feed projecting device rotatable about the axis of said receptacle, comprising a spring acting blade member having a scoop member extending from each of its sides, said blade member being adapted to extend within said receptacle and to scoop up a measured quantity of feed therefrom at each revolution, adjustable means for setting said blade member under greater or lesser tension when it reaches its feed projecting position, means for rotating said conveying device in the feed conveying direction, a reversible operative connection between said conveying device and feed projecting device, means for securing said apparatus in position, and an angularly adjustable connection between said apparatus and said securing means.

11. An apparatus for supplying feed comprising a feed supplying chamber, a feed collecting receptacle, a conveying device interposed therebetween, cam controlled valve means for intermittently supplying water to said chamber, means within said chamber for chopping the feed supplied to said conveying device, and a feed projecting device comprising a rotatable spring acting blade member having a scoop member extending therefrom, said blade member being adapted to extend within said receptacle and to scoop up a measured quantity of feed therefrom at each revolution, and means for setting said member under tension when it reaches its feed projecting position.

12. An apparatus for supplying feed comprising a feed supplying chamber, an open top substantially semicircular feed collecting receptacle, a conveying device interposed therebetween, cam controlled valve means for intermittently supplying water to said chamber, means within said chamber for chopping the feed supplied to said conveying device, a feed projecting device rotatable about the axis of said receptacle, comprising a spring acting blade member having a scoop member extending therefrom, said blade member being adapted to extend within said receptacle and to scoop up a measured quantity of feed therefrom at each revolution, means for setting said blade member under tension when it reaches its feed projecting position, means for rotating said conveying device in the feed conveying direction, and means operatively associated therewith for actuating said chopping means and feed projecting device.

CHARLES HENRY CUPPLES.